350-96.29 SR
E197A XR 3,445,666
X350-96.29

ELECTRO-OPTICAL DEVICE WITH CONCENTRIC ARRANGEMENT OF LAYERS

Filed Oct. 26, 1964

INVENTOR
ALVIN A. SNAPER
BY Allen E. Botney
ATTORNEY 3,445,666
ELECTRO-OPTICAL DEVICE WITH CONCENTRIC ARRANGEMENT OF LAYERS Alvin A. Snaper, P.O. Box 83,
Burbank, Calif. 91503

Filed Oct. 26, 1964, Ser. No. 406,362
Int. Cl. H01j 39/12
U.S. Cl. 250—211 2 Claims

ABSTRACT OF THE DISCLOSURE

This invention combines the features of photoconductive and ferroelectric materials in such a manner as to provide an electro-optical memory device. More particularly, photoconductive and ferroelectric layers are sandwiched between a pair of transparent conductors, the entire group being arranged in a concentric pattern. Information is stored in the device when a D-C voltage is applied to it at the same time that a point of light is directed against it. The same information is read out by reversing the polarity of the voltage while the light is directed against the same point on the device.

Figures 1, 2, 3:
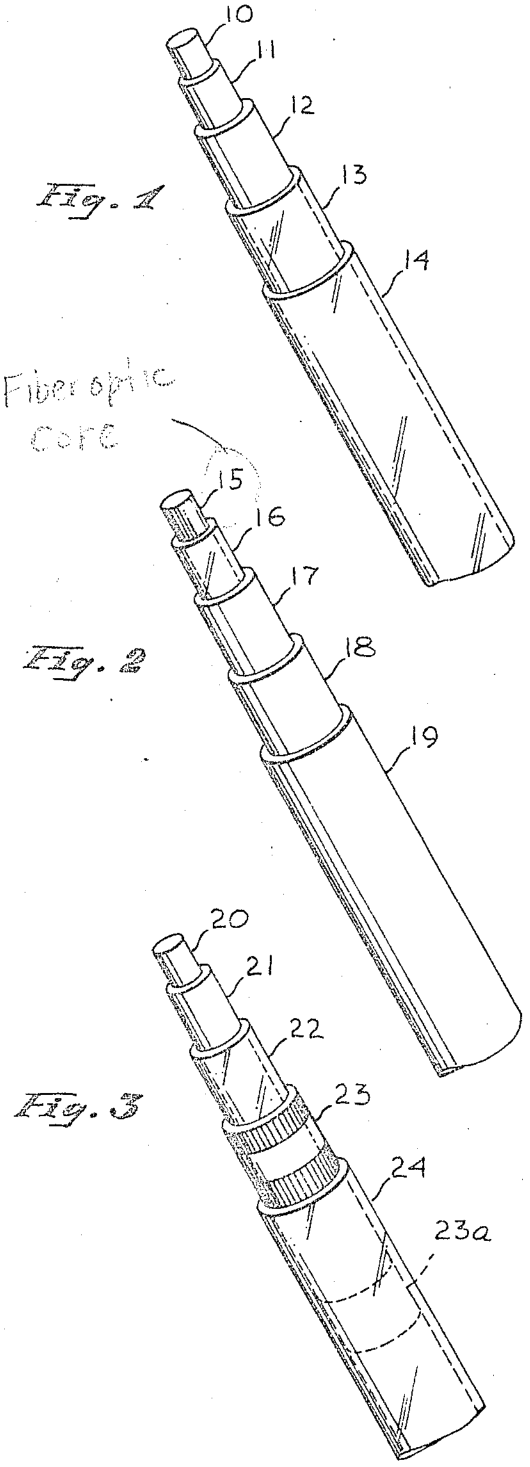

The present invention relates in general to the electro-optical arts and more particularly relates to an electro-optical charge-storage element and the process by which it is manufactured.

The invention and the embodiments thereof as illustrated and described in detail herein is basically a charge-storage device and, depending upon its configuration, may be utilized either as an electro-optical memory device, a photoconductive programable switch, or a photocell. Moreover, although these embodiments are basically illustrated in the form of a cylindrical and concentric device, which may be most desirable from the standpoint of ease of fabrication, it should nevertheless be understood that the device can be constructed in some other but similar geometric form as well, such as, for example, a continuous ribbon. More important, however, than the economies of fabrication, the availability of such a device in continuous lengths, makes feasible certain computer memory core configurations which might otherwise be impractical when implemented by similar devices utilized as individual cells or plates.

It is, therefore, an object of the present invention to provide a new and improved electro-optical storage device.

It is another object of the present invention to provide an electro-optical element having a basically cylindrical and concentric type of configuration.

It is a further object of the present invention to provide a new process by means of which an electro-optical device according to the present invention can be manufactured.

The novel features which are believed to be characteristic of the invention, both as to its manufacture, construction and method of use, together with further objects and advantages thereof, will be better understood from the following description considered in connection with the accompanying drawing in which several embodiments of the invention are illustrated by way of example. It is to be expressly understood, however, that the drawing is for the purpose of illustration and description only and is not intended as a definition of the limits of the invention.

Figure 1A:
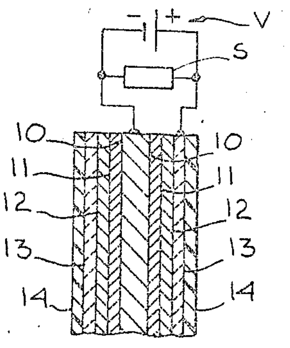
Figure 2A:
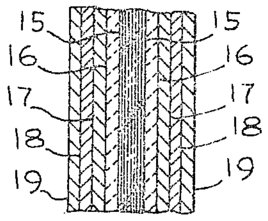
Figure 3A:
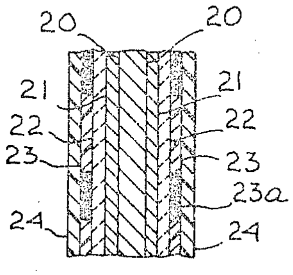

FIGURE 1 illustrates one embodiment of an electro-optical memory device according to the present invention and is partly cut away to show the different layers thereof;

FIGURE 1*a* is a side view of the FIG. 1 device in cross-section;

FIGURE 2 illustrates another embodiment of an electro-optical memory device according to the present invention and this embodiment too is cut away to show the different layers thereof;

FIG. 2*a* is a side view of the FIG. 2 device in cross-section;

FIGURE 3 illustrates a third embodiment of an electro-optical device according to the present invention and here again it is partly cut away to reveal the several layers it comprises; and FIG. 3*a* is a side view, in cross-section, of the FIG. 3 device.

Considering now the drawing, reference is made in particular to FIGS. 1 and 1*a* wherein the embodiment is shown to include a conductive wire core 10 over which a thin layer 11 of ferro-electric material is deposited. A photoconductive layer 12 is deposited over ferro-electric layer 11 and, in turn, the photoconductor is covered with a thin layer 13 of a transparent conductor material. Finally, for the purpose of protecting the several layers beneath it, the device includes an outermost layer 14 made of a transparent dielectric material. Also shown in FIG. 1*a* are a D-C voltage source, generally designated, V, electrically connected between wire 10 and conductive layer 13, and some means S also connected between these two elements for selectively reversing the voltage polarity between them at the appropriate time.

In its operation, when a spot of light impinges on the outer layer, namely, transparent dielectric layer 14, the light passes through transparent conductor 13 to photoconductive layer 12 therebeneath, with the result that the photoconductor is thereby activated or, stated differently, its resistance is thereby very greatly reduced. This allows current to flow at the illuminated point through the ferro-electric material of layer 11 and into the conductive core, thus completing the circuit. With the removal of the light, the ferroelectric at that point retains an electrical charge which is independent of current. If, now, the voltage polarity is reversed and the identical point previously impinged illuminated once again, the stored charge will enter the system as a pulse of a previously defined polarity and magnitude. In summary, therefore, it may be said that the ferroelectric layer "remembers" a specific point or area in which a signal or information input has been recorded and, when suitably scanned, releases this information in the form of a discreet pulse.

With respect to the process for manufacturing the FIG. 1 device, the first step is that of depositing a layer of ferroelectric 11 on wire core 10. To do this, wire 10 is heated to an extent sufficient to raise and maintain the temperature of the wire over or higher than the fusing temperature of the ferroelectric material. Thus, if, for example, barium titanate were used as the ferroelectric material, since barium titanate has a fusing temperature of between 1600°–1650° centigrade, the wire would be heated and initially maintained above the 1650° centigrade level. The desired temperature can be attained or reached either by inductive heating of the wire, which involves sending an electric current through the wire, or by any other suitable heating arrangement. However, the inductive heating technique is to be preferred because it produces a rapid temperature rise, which retards oxidation of the wire core and, therefore, allows it to be quickly brought into contact with the ferroelectric material. This is only one advantage to employing inductive heating of the wire core. There is the further important advantage that pre-heating of the ferroelectric material is thereby avoided, with the result that the ferroelectric material can be kept at room temperature during the manufacturing process or at some other temperature well below the wire temperature. In the vacuum deposition technique, for example, the ferroelectric material is employed in a vacuum in an oven and condensation deposition of it usually occurs which, in turn, results in a deterioration of its ferroelectric properties.

As previously mentioned, barium titanate is one example of a ferroelectric material that could be used here. However, other ferroelectric materials are also available and may also be used, such as, for example, lead zirconate suitably doped to enhance its ferroelectric properties. Accordingly, it will be recognized that in the event any such other ferroelectric materials are used for layer 11, the fusing temperatures of such other materials would be different than that for barium titanate mentioned above and, therefore, the wire core would likewise be heated to and maintained at a correspondingly different temperature. With respect to wire core 10 and assuming the utilization of the induction heating technique, any high temperature wire material is recommended. Thus, tungsten and platinum are two appropriate wire core materials, as well as high temperature graphite.

In practicing this first step in the process, namely, the application of layer 11 onto the wire core, the heated wire is brought into contact with the ferroelectric material by pulling it at a constant speed through the ferroelectric material which is preferably in a fine powder form, typically 3–20 microns thick, with the result that the ferroelectric powder fuses to the wire core at its surface. The ultimate thickness of the ferroelectric layer is controlled and determined by controlling the amount of time the ferroelectric material remains in contact with the wire, that is to say, its duration of contact with the wire, and the initial temperature of the surface of the wire core, that is to say, the temperature of the interface between the wire core and the ferroelectric material. It will be recognized that the duration of contact is dependent on the speed with which the wire is pulled through the ferroelectric material. Although different thicknesses of the ferroelectric layer may be obtained in this way, a layer of less than 1 mil thickness is considered most desirable so that nominal voltages could be applied across it. Better flexibility is also obtained with a thinner layer.

The next step in the manufacturing process is that of depositing photoconductor material over the already formed ferroelectric layer to form layer 12. The photoconductor layer is ideally provided by the vacuum deposition technique; however, a sintering technique can also be used in which the photoconductor material, in a slurry form, is applied to the surface of layer 11 by brushing or spraying it on or by passing the wire core-ferroelectric layer combination through the slurry. Once the slurry material is on, the element is then dried, thereby leaving a dry coating of photoconductor material on the surface of the ferroelectric layer. The combination thus produced is next put through a suitable sintering heat cycle, the temperature, time and atmospheric parameters of the particular cycle being dependent on the type of photoconductor material used and if it is doped to enhance its photoconductive properties, they are also dependent upon the type and extent of the doping. Thus, by way of a concrete example, cadmium sulphide is a suggested photoconductor material and if used and doped with five parts per million of copper to enhance the photoconductive properties of the cadmium sulphide, a fifteen minute heat cycle at 600° centigrade and in an inert atmosphere is preferably used. When the sintering is completed, it is found that a layer of photoconductor material is formed that is very firmly bonded to the layer of ferroelectric material beneath it. The thickness of photoconductor layer 12 is preferably less than ½ mil and it is even more preferable that its thickness be in the order of $\frac{1}{10}$ mil or less, there being several reasons why such a relatively thin layer would be desirable. First, it helps provide the electro-optical element with the desired flexibility and the desired degree of resolution. Second, the thinner the layer, the better light-to-dark ratios that can be obtained.

With the addition of photoconductor layer 12, the next step in the process is that of applying a layer of electrically conducting and transparent material, namely, layer 13, over it. By way of example, layer 13 may be nothing more than a thin film of metal, such as gold, and may be formed over layer 12 by means of standard and well known vacuum deposition techniques. Finally, to protect the several layers beneath it, an outermost layer 14 made of a transparent dielectric material is coated on, either by spraying or painting it on or else by dipping the element in the dielectric material.

The manufacture of the desired electro-optical device is completed by cutting the element to the desired length.

Attention is now directed to FIGS. 2 and 2*a* wherein a second embodiment of the present invention is illustrated and, as shown therein, this second embodiment includes a fiber optic core 15 over which is deposited a transparent conductor layer 16 which, in turn, is covered with a photoconductor layer 17. Also included in this second embodiment is a ferroelectric layer 18 deposited over layer 17 and, finally a layer 19 of conductor material formed over and covering the ferroelectric layer. With but one exception, the electro-optical device of FIGS. 2 and 2*a* is manufactured by substantially the same process as that used and described above in connection with the device of FIGS. 1 and 1*a*, the exception being brought about by the fact that a fiber optic core 15 is used here rather than the metal wire core used in the earlier-described device. More specifically, it will be apparent to those skilled in the art that because a fiber optic core is used, an induction heating technique for applying the ferroelectric material cannot be employed. Consequently, in connection with the process for the manufacture of the device in FIGS. 2 and 2*a*, the ferroelectric layer is provided by painting it on, spraying it on, or by dipping the element in a slurry of the ferroelectric material. It should also be mentioned that conductor layer 19 may be produced by standard electroplating or electroforming techniques or, here again by spraying or painting it on.

In its operation, when light is routed through optic core 15, a substantial portion of this light escapes from the core and passes through transparent conductor layer 16 to become incident upon photoconductor layer 17, with the result that it activates the photoconductor layer to thereby allow current to flow through ferroelectric layer 18. Thus, the entire length of the element stores a charge in the ferroelectric layer which is retained after the light input ceases. As was explained earlier, this may be read-out at any subsequent time by scanning the core with light and by reversing the voltage polarity applied to the device. It should also be mentioned that during the period in which light travels through the core, that portion of the device lying between layers 16 and 19 becomes entirely conductive, which provides for additional informational usage.

Considering now the programable switching device illustrated in FIGS. 3 and 3*a*, this embodiment again includes a wire core 20 as in FIG. 1, a photoconductor material being deposited in a layer 21 over the core and a layer 22 of transparent conductor material being deposited over layer 21. Mounted over conductor layer 22 is another layer of material in the form of a patterned mask 23 by which is meant that it is alternately opaque and transparent, the opaque and transparent areas being arranged in a desired pattern. Masking layer 23 may be made of a photographic film material on which the opaque and transparent areas can be provided through standard photographic techniques, or it may be a printed material, or the like, in short, layer 23 may be made of any material and in any manner whatsoever so long as an opaque-transparent pattern is provided over layer 22. Finally, a transparent dielectric layer 24 is coated over patterned mask 23, again for the purpose of protecting the several layers beneath it. It will be noted that, whereas each of the earlier-described devices included a ferroelectric layer, the present device does not include such a layer.

In operation, when an external source of light is impinged on the outer transparent dielectric protective layer, it is transmitted to the patterned mask which, as was previously mentioned, is alternately opaque and transparent. The light causes no activity when intersecting an opaque portion of the mask. However, when a transparent portion of the mask is intersected, the light activates the underlying photoconductive layer and allows electrical current to flow by completing the circuit to the conductive wire core. It is thus seen that this kind of a device may be used as a switch, with the particular switching arrangement being programable in advance.

Although it was mentioned once before, it should nevertheless be mentioned once again for emphasis that the several constructions shown herein lend themselves to economical mass production fabrication methods. In addition, with respect to the FIG. 1 and FIG. 3 devices, both of which have wire cores, the structural configuration of each is such that the photoconductive element becomes a series continuation of the circuit wiring when no light is impinged on it, with the result that the wire can then be utilized as a normal portion of a circuit.

Although a number of particular arrangements of the invention have been illustrated above by way of example, it is not intended that the invention be limited thereto. Accordingly, the invention should be considered to include any and all modifications, alterations or equivalent arrangements falling within the scope of the annexed claims.

Having thus described the invention, what is claimed is:

1. A concentrically-arranged electro-optical device comprising: a fiber optic core; a layer of a transparent conductor material deposited over the surface of said core; a layer of photoconductor material covering said transparent conductor layer; a layer of ferroelectric material deposited over said photoconductor layer; and an opaque conductor layer covering said ferroelectric layer.

2. A concentrically-arranged electro-optical device comprising: a metal wire core; a layer of photoconductor material covering said core; a layer of transparent conductor material deposited on said photoconductor layer; and a mask having a predetermined pattern of opaque and transparent areas on it mounted over said transparent conductor layer.

References Cited

UNITED STATES PATENTS

| | | | |
|---|---|---|---|
| 3,310,681 | 3/1967 | Hargens | 250—227 |
| 2,912,592 | 11/1959 | Mayer | 250—211 |
| 3,011,157 | 11/1961 | Anderson. | |
| 3,046,540 | 7/1962 | Litz et al. | |
| 3,047,867 | 7/1962 | McNaney | 250—227 X |
| 3,056,031 | 9/1962 | McNaney | 250—227 X |
| 3,083,262 | 3/1963 | Hanlet | 250—213 X |
| 3,215,846 | 11/1965 | McNaney | 250—213 |
| 3,235,736 | 2/1966 | Frankl | 250—213 |
| 3,274,388 | 9/1966 | Distel | 250—211 X |

RALPH G. NILSON, *Primary Examiner.*

M. A. LEAVITT, *Assistant Examiner.*

U.S. Cl. X.R.

250—213, 227